United States Patent [19]

Stone et al.

[11] Patent Number: 5,438,959

[45] Date of Patent: Aug. 8, 1995

[54] AQUARIUM WITH FULL-WIDTH PLANAR BUBBLE CONDUIT

[76] Inventors: Ray Stone; Nancy Stone, both of 1504 Wendy Way, San Jose, Calif. 95125; Terry Hoppins, 1305 Kimberly Dr., San Jose, Calif. 95118

[21] Appl. No.: 304,268

[22] Filed: Sep. 12, 1994

[51] Int. Cl.$^6$ .............................................. A01K 63/00
[52] U.S. Cl. ..................................... 119/248; 119/263
[58] Field of Search ............... 119/245, 247, 248, 253, 119/254, 257, 263, 269

[56] References Cited

U.S. PATENT DOCUMENTS

| | | | |
|---|---|---|---|
| 1,956,524 | 4/1934 | Byram | 119/245 X |
| 3,101,564 | 8/1963 | Stoessel | 119/254 X |
| 3,276,428 | 10/1966 | Burch | 119/257 |
| 3,326,185 | 6/1967 | Perez | 119/254 |
| 3,735,738 | 5/1973 | Lake | 119/257 |
| 3,874,336 | 4/1975 | Murphy | 119/5 |
| 4,160,427 | 7/1979 | Holbrook | 119/254 |
| 4,353,327 | 10/1982 | Shroyer | 119/5 |
| 4,967,694 | 11/1990 | Waldman | 119/5 |
| 4,972,801 | 11/1990 | Hunt | 119/263 X |
| 5,245,945 | 9/1993 | Liao | 119/248 |
| 5,306,421 | 4/1994 | Weinstein | 210/151 |

Primary Examiner—Gene Mancene
Assistant Examiner—Thomas Price

[57] ABSTRACT

An aquarium includes a water tank received in a picture-frame-shaped housing suitable for either mounting on a wall or being supported on a stand. The housing includes a hidden storage space for neatly storing an air pump. A vertical sheet or partition extending between the sides of the tank divides the tank into a full-width, but relatively thin and flat, bubble conduit behind the partition for carrying air bubbles, and a habitation compartment in from of it for keeping fish. The lower edge of the partition is spaced above the bottom of the tank to form a gap or water intake, and the upper edge of the partition is spaced below the water line to form a water return. An elongated air diffuser substantially extends between the side edges of the bubble conduit near its bottom. When supplied air by the pump, the diffuser emits a wide sheet of air bubbles that rise upwardly through the bubble conduit to aerate the water. The rapidly rising air bubbles also create an upwardly moving water current in the bubble conduit that circulates water from the habitation compartment, through an under-gravel filter positioned at the bottom thereof, through the intake under the partition, up the bubble conduit, and back into the habitation compartment.

18 Claims, 4 Drawing Sheets

AQUARIUM WITH FULL-WIDTH PLANAR BUBBLE CONDUIT

FIELD OF THE INVENTION

This invention relates generally to aquariums, specifically to an aquarium with improved filtration and aeration.

BACKGROUND OF THE INVENTION

A typical aquarium includes a transparent tank for holding water and fish, an air pump, and a water filter. The pump continuously aerates the water, i.e., adds oxygen thereto, through a submerged, highly porous "air stone" or diffuser, which breaks up the air into a great number of tiny air bubbles. The filter removes debris and waste matter when the water is circulated through it by either a mechanical pump, or by water current generated by the rapidly rising air bubbles from the diffuser. Most aquariums are bulky and heavy, so that they must be supported on a sturdy floor stand or desk. Such arrangements consume valuable floor or desk space, and also position the aquariums at below eye level, so that a person must bend or kneel down to view the aquatic life.

Various wall-mounted aquariums have been proposed for being positioned at eye level for convenient viewing, and that require zero footprint for conserving space. U.S. Pat. Nos. 3,874,336 to Murphy (1975); 4,353,327 to Shroyer (1982); and 4,967,694 to Waldman (1990) show aquariums for mounting on walls. The Murphy device is a simple fish bowl with a mounting plate and a light; the Shroyer device includes an ornamental picture frame surrounding a relatively thin tank with a graphical background; and the Waldman device includes a bracket for slidably receiving the tank and interchangeable background art. However, none of these aquariums includes an aeration and filtration system. Therefore they are limited to keeping rugged aquatic life, such as gold fish, that can survive in dirty water with low oxygen content. Although separate aeration and filtration systems can be added, none of these aquariums includes storage space for holding accessories. As a result, a bundle of unsightly wires and hoses must dangle from the tanks to connect to external pumps and wall-mounted power sockets.

Aquariums with self-contained aeration and filtration systems have also been proposed. U.S. Pat. No. 5,245,945 to Liao (1993) shows a tank divided by a partition extending between the front and back thereof into a primary compartment for holding larger fish, and a smaller secondary compartment for holding smaller fish. A U-shaped filter is disposed within the secondary compartment. An air hose with a diffuser at its distal end is positioned within a submerged bubble tube or conduit. Rapidly rising air bubbles emitted from the diffuser create an upwardly moving water current within the bubble conduit to draw water through the filter. However, the small bubble conduit has a limited carrying capacity and a correspondingly low pumping rate. Furthermore, the longitudinal partition reduces the width and therefore the display area of the primary compartment. Also the unsightly accessories, such as the pump, hoses, and bubble conduit, are all plainly visible, and therefore detract from the display of the fish. U.S. Pat. No. 5,306,421 to Weinstein (1994) also shows a tank divided by a longitudinal partition into a habitation compartment for holding fish, and a filtration compartment housing an electric water pump and a filter assembly. Again, the compartments side-by-side arrangement reduces the width of the tank's display area.

A wall-mounted aquarium with a decorative picture frame is disclosed in a brochure of Boschert Aquatics, Los Gatos, Calif. It has a built-in, triangular bubble conduit partitioned from a corner of the tank, and a built-in under-gravel filter. However, the conduit has a small cross-section and low carrying capacity, so that its aeration and filtration efficiencies are low. Furthermore, the cropped corner of the tank, i.e., the triangular bubble conduit, gives the interior of the tank an irregular and untidy appearance. The bubble conduit is opaque, so that it hides the attractive bubbles. The aquarium has no storage space for the pump, which must be positioned outside of the device, such as on the floor or a desk. It is also not illuminated, so that optimal viewing is only possible in strong ambient light.

These and all other prior art aquariums are either mere fish bowls without aeration or filtration, or have an inadequate or poorly arranged aeration and filtration system. Some aquariums include a filtration system that uses a small bubble conduit with limited carrying capacity; some are divided into side-by-side habitation and filtration compartments that reduce the width of the display area; some are not illuminated, so that they do not optimally display the colorful fish kept therein; and some include no storage space for accessories, so that a bundle of unsightly wires and hoses must dangle therefrom.

OBJECTS AND ADVANTAGES

Accordingly the primary objects and advantages of the present invention are to provide an improved aquarium, an aquarium which maximizes the width of the habitat or display area, which provides a very attractive bubble display, and which provides significantly improved aeration and water filtration.

Other objects and advantages of the invention are to provide an aquarium which can be either mounted on a wall or supported on a stand, which fully encloses and hides all necessary accessories for a tidy appearance, which illuminates the aquatic life therein for improved viewing, which has an easily replaceable ornamental picture mat or border, and which is easy to clean.

SUMMARY OF THE INVENTION

The aquarium includes a transparent tank surrounded by a picture,frame-shaped housing suitable for wall mounting. An air pump is received in a hidden storage space below the tank. The tank is divided by a transparent partition that extends between its sides into a full-width habitation compartment at the front thereof for holding fish, and a full-width bubble conduit at the back thereof for carrying air bubbles. The lower edge of the partition is spaced above the bottom of the tank to form a full-width water intake aperture, and the top edge of the partition is spaced below the water line to form a water return aperture. A full-width air diffuser, which is fed by the air pump through a hose, is positioned horizontally near the bottom of the bubble conduit to emit a wide sheet of rising bubbles therein. The rising bubbles create an upwardly moving water current, which draws water from the habitation compartment through an under-gravel filter positioned at the bottom thereof, through the intake aperture under the partition, up the bubble conduit, and returns the water into the habitation compartment through the return aperture.

Figure 1A:
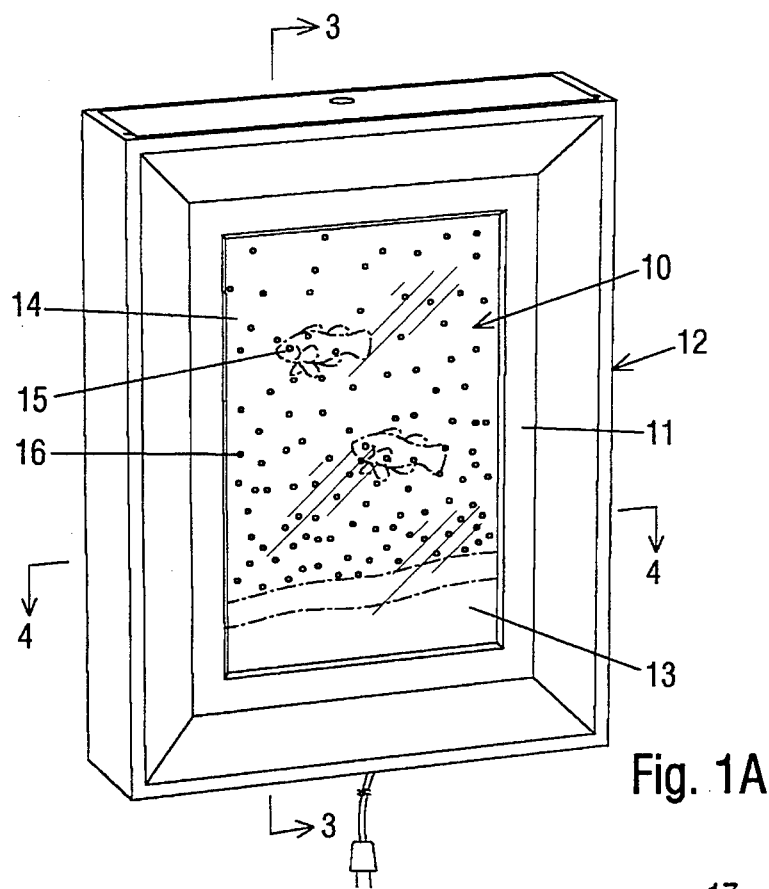
FIG. 1A is a front isometric view of an aquarium in accordance with a preferred embodiment of the invention.

| Drawing Reference Numerals | |
|---|---|
| 10. Tank | 11. Mat |
| 12. Housing | 13. Gravel |
| 14. Water | 15. Fishes |
| 16. Bubbles | 17. Top Cover |
| 18. Side Of Housing | 19. Side Of Housing |
| 20. Bottom | 21. Support Member |
| 22. Storage Space | 23. Air Pump |
| 24. Notch | 25. Electrical Cord Of Pump |
| 26. Retaining Member | 27. Screw Holes |
| 28. Gap | 29. Air Hose |
| 30. Cross Member | 31. Mounting Beam |
| 32. Nails | 33. Transparent Front |
| 34. Opaque Side | 35. Opaque Side |
| 36. Opaque Back | 37. Bottom |
| 38. Top Cover | 39. Chamfered Corners |
| 40. Handle | 41. Transparent Partition |
| 42. Slots | 43. L-Brackets |
| 44. Air Diffuser | 45. Mounting Rings |
| 46. Under-Gravel Filter | 47. Slots |
| 48. Spacers | 49. Habitation Compartment |
| 50. Bubble Channel | 51. Spacers |
| 52. Water Intake Aperture | 53. Mounting Bracket |
| 54. Light Bar | 55. Electrical Cord Of Lamp |
| 56. Slots | 57. Electrical Cord Of Heater |
| 58. Extension Cord | 59. Submersible Heater |
| 60. Water Return Aperture | |
| C1. Water Current | |
| F1. Intake Water Flow | F1. Return Water Flow |

DESCRIPTION-FIGS. 1A AND 1B

In accordance with a preferred embodiment of the invention shown in the front isometric view in FIG. 1A, an aquarium includes an acrylic tank 10 flamed by a decorative border or mat 11, and received in a picture-flame-shaped housing 12. Tank 10 holds a layer of gravel 13 on its bottom, and is filled with water 14 and fishes 15. A sheet of bubbles 16, which will be explained infra, continuously rise along the back side of tank 10.

Figure 1B:
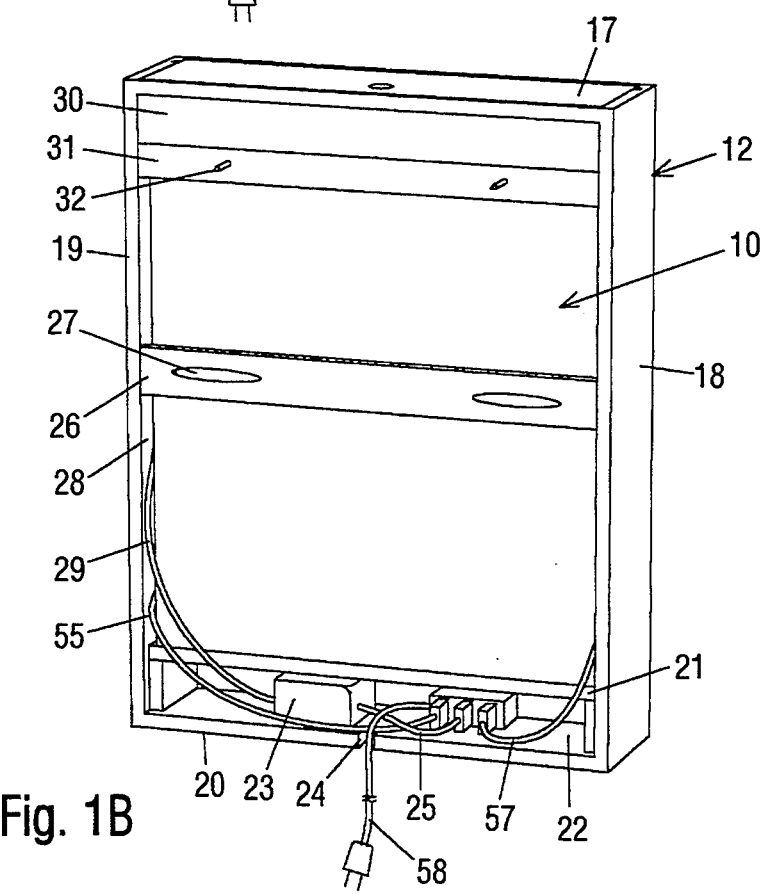
FIG. 1B is a rear isometric view of the aquarium.

As shown in the rear isometric view in FIG. 1B, housing 12 includes a removable top cover 17, opposite sides 18 and 19, and a bottom 20. A support member 21 extends between sides 18 and 19 to support tank 10 thereon, and defines a hidden storage space 22 below it that receives and hides a conventional electric air pump 23. A notch 24 in bottom 20 allows the passage of an extension cord 58, which includes outlets that connect to electrical cords 25, 55, and 57 of pump 23 and two other electrical accessories, respectively, which will be further explained infra. Instead of having three unsightly electrical cords dangling from the aquarium, extension cord 58 reduces the number to just one.

A retaining member 26, which is removably mounted between sides 18 and 19 by screws (not shown) disposed in angled screw holes 27, retains tank 10 in housing 12. The interior of housing 12 is slightly wider than tank 10, so that a pair of gaps 28 (one shown) are formed on the sides of tank 10. Gaps 28 receive and hide electrical cords 55 and 57, and an air hose 29 connected to pump 23, so that they cannot be seen from the front. The distal end of air hose 29 is submerged in tank 10, and will be further explained infra. Housing 12 includes a cross-member 30 that removably engages a mounting beam 31, which can be attached to a wall (not shown) with nails 32 for hanging the aquarium thereon.

DESCRIPTION-FIG. 2

Figure 2:
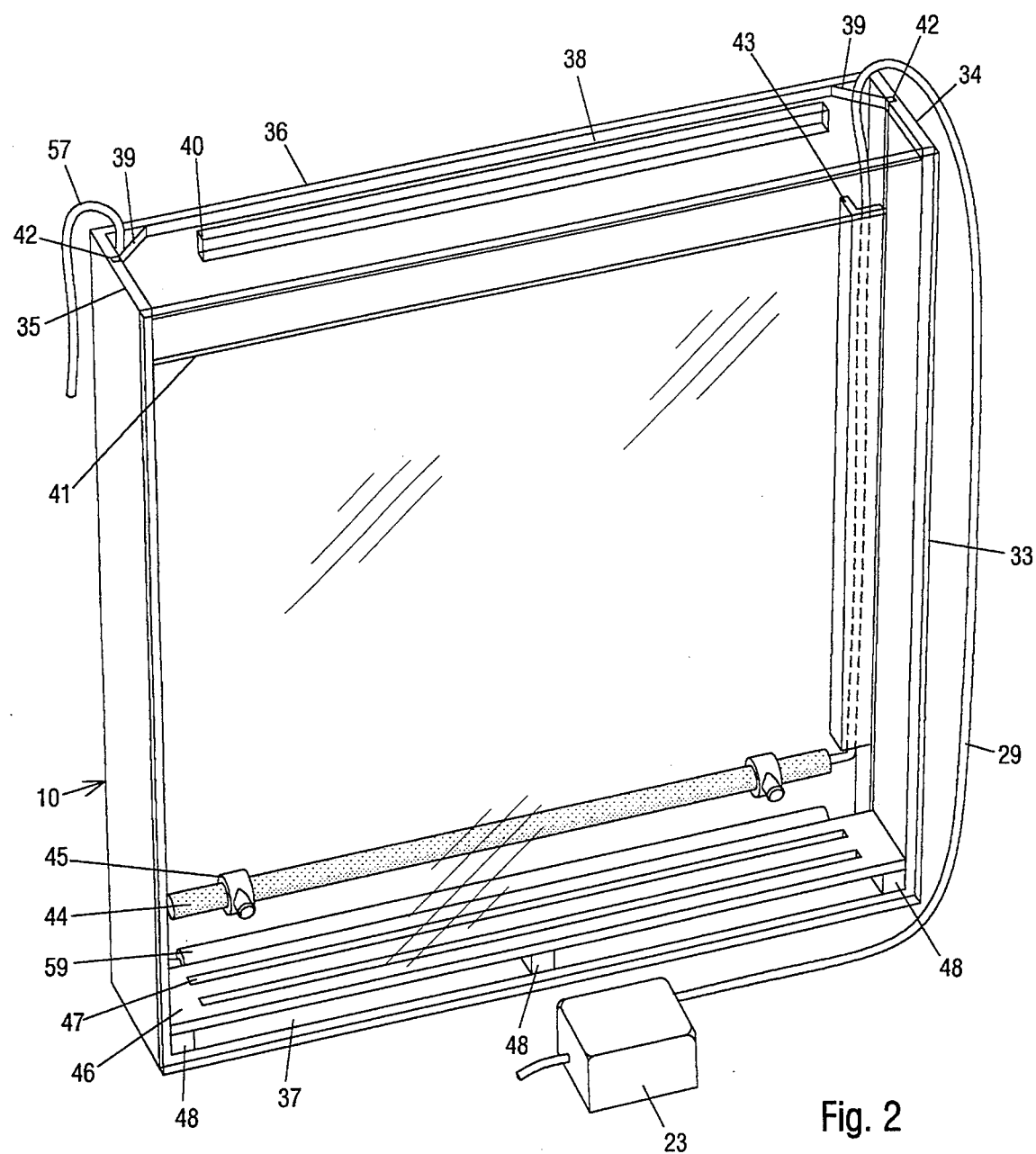
FIG. 2 is a front isometric view of a water tank of the aquarium.

Tank 10 is shown in a front isometric view in FIG. 2; housing 12 (FIG. 1A) is omitted here for clarity. Acrylic tank 10 includes a transparent front 33, opaque opposite sides 34 and 35, an opaque back 36, a bottom 37, and a removable transparent top cover 38, which includes chamfered rear corners 39, and a handle 40. Opaque sides 34 and 35, and opaque back 36 are all of the same color to provide a uniform visual background. Bottom 37 can be either transparent or opaque, because it will be normally hidden by gravel (not shown).

A removable, transparent acrylic sheet or planar partition 41 spans the width of tank 10, and is slidably received in slots 42 formed into sides 34 and 35. A pair of opaque L-brackets 43 (one shown) are attached to the opposite sides of partition 41: one L-bracket 43 receives and hides air hose 29, and the other L-bracket (not shown) hides electrical cord 57 of a conventional, submersible heater 59 positioned behind partition 41. Air hose 29 carries air from pump 23 to a horizontal, elongated "air stone" or diffuser 44 mounted on the back side of partition 41 by a pair of mounting rings 45. Diffuser 44 substantially spans the width of tank 10. A removable under-gravel filter 46 includes slots 47 and spacers 48 for spacing it above bottom 37 of tank 10.

DESCRIPTION-FIG. 3

Figure 3:
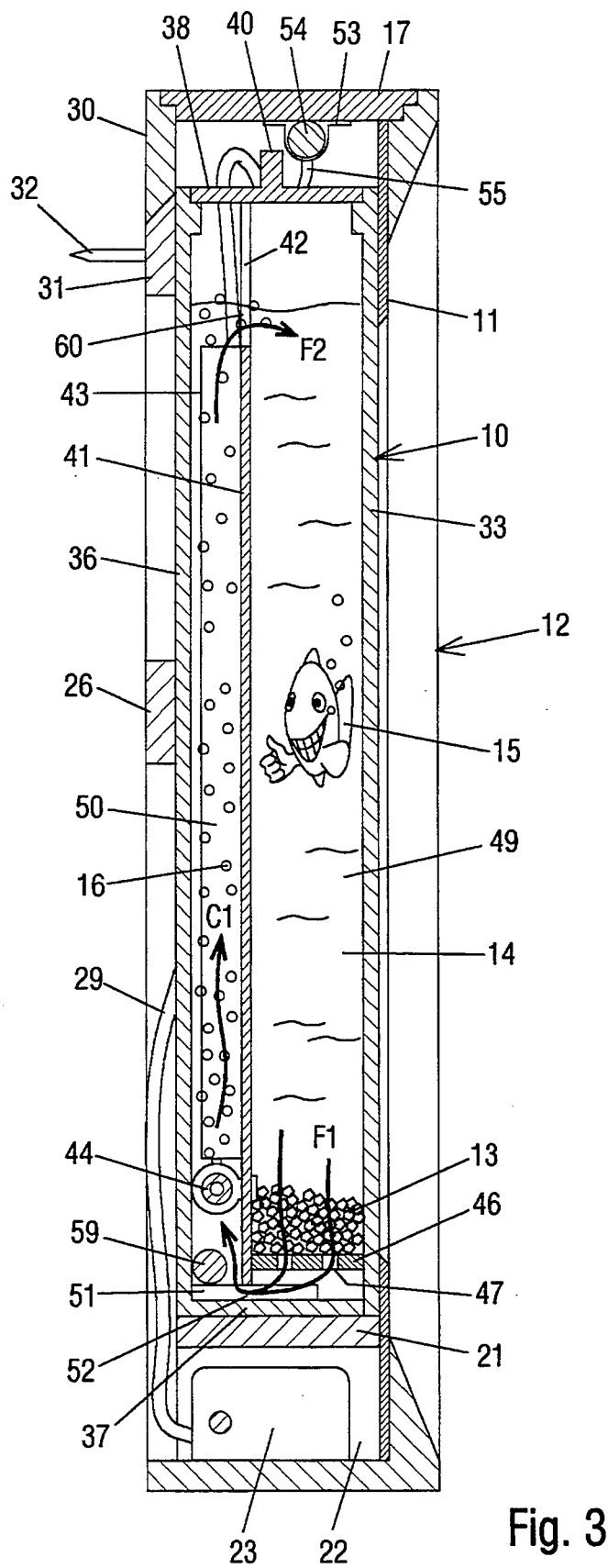
FIG. 3 is a side sectional view of the aquarium taken along line 3—3 in FIG. 1A.

The aquarium of FIG. 1A is shown in a side sectional view in FIG. 3. Partition 41 divides tank 10 into a habitation compartment 49 in the front thereof, and a planar bubble conduit 50 in the back thereof. The bottom edge of partition 41 is spaced above bottom 37 of tank 10 by a pair of spacers 51 (one shown) to form a gap or water intake aperture 52, whereas the top edge of partition 41 is spaced below the water line to form a water return aperture 60. Cross-member 30 and mounting beam 31, which can be attached to a wall (not shown), have beveled opposite edges for hanging the aquarium. The aquarium has a flat bottom, so that it can be alternatively supported on a desk or floor stand (not shown) if desired. A bracket 53 mounts a conventional light bar 54 under top cover 17 of frame 12. Light bar 54 includes electrical cord 55 extending therefrom, and can be either DC or AC powered. Light bar 54 illuminates the fish through transparent cover 38 of tank 10 for improved viewing, regardless of ambient lighting conditions.

In use, pump 23 continuously supplies air to diffuser 44 through hose 29. Diffuser 44 thus continuously emits a sheet of air bubbles 16 to aerate the water. The rising bubbles also create an upwardly moving water current C1, which draws in water from habitation compartment 49 as intake flow F1 through gravel 13, slots 47 in under-gravel filter 46, and intake aperture 52 under partition 41. As water is drawn through gravel 13, debris and waste matter are filtered from the water. The water flowing upwardly in bubble conduit 50 is eventually returned to habitation compartment 49 through return aperture 60 as return flow F2. The cycle is constantly repeated, so that water is continuously circulated through tank 10 in a clockwise direction.

The interior of tank 10 can be easily cleaned by removing covers 17 and 38. Alternatively, tank 10 can be removed from housing 12 for cleaning by removing retaining member 26. Either way, partition 41, gravel 13, and under-gravel filter 46 can all be removed from tank 10 so that they can be cleaned individually, and so that the entire interior of tank 10 is exposed for thorough cleaning.

DESCRIPTION-FIG. 4

Figure 4:
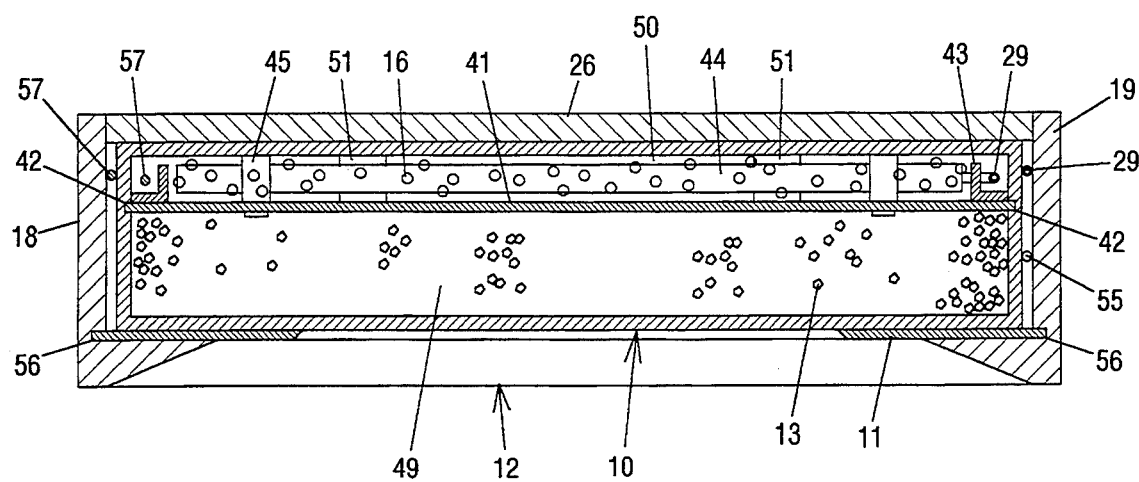
FIG. 4 is a top sectional view of the aquarium taken along line 4—4 in FIG. 1A.

The aquarium is shown in a top sectional view in FIG. 4. Bubble conduit 50 substantially spans the width of tank 10, i.e., it is a full-width conduit. Unlike the small tubular bubble conduits in prior art aquariums, bubble conduit 50 has a much larger cross-sectional area and a much higher carrying capacity. Full-width bubble conduit 50 can accommodate full-width diffuser 44; this combination allows more bubbles to be introduced into more water at the same time to improve aeration and current flow, which in turn improves filtration. Also unlike the prior art aquariums with side-by-side habitation and filtration/aeration compartments that substantially reduce the width of the display window, bubble conduit 50 is positioned directly behind habitation compartment 49, i.e., in a front-and-back arrangement, so that bubble conduit 50 does not compromise the size of the display window.

Each of sides 18 and 19 of housing 12 includes a slot 56 for slidably receiving the opposite edges of mat 11, which can be easily removed and replaced with another one (not shown) of a different style or color if desired.

DESCRIPTION-FIG. 1A

In use, diffuser 44 (FIG. 3 ) emits a sheet of rising bubbles 16 that substantially span the width of tank 10. In addition to improving filtration and aeration, the sheet of bubbles 16 also provide a very attractive, prominent, and constantly changing display.

CONCLUSION, RAMIFICATIONS, AND SCOPE

Accordingly the reader will see that we have provided an improved aquarium. Its full-width diffuser and its high capacity, full-width bubble conduit produce substantially improved filtration and aeration, and also provide a very attractive display of rising bubbles that span the back of the tank. The full-width bubble conduit is positioned behind the habitation compartment, so that it does not compromise the width of the display window. The aquarium can be mounted on a wall to resemble a live picture and to conserve floor or desk space, or alternatively it can be supported on a desk or floor stand. Its frame or housing hides the pump and its wires and hoses for a tidy and attractive appearance. It illuminates the fishes within for improved viewing, regardless of the ambient lighting conditions. It includes a replaceable decorative mat, which can be easily changed for another one of a different style or color if desired. It is also easy to disassemble and clean.

Although the above descriptions are specific, they should not be considered as limitations on the scope of the invention, but only as examples of the preferred embodiment. Many other ramifications and variations are possible within the teachings of the invention. For example, the partition can be provided in different widths, so that it can be mounted into different tanks with add-on rails mounted to the sides of the tanks. The partition and the L-brackets can be attached to the back of the tank with suction cups, so that the brackets butt up against the back to form a seal. The L-brackets can be formed as integral parts of the partition. Instead of being partitioned out of the tank, the bubble conduit can be made as a pipe with its own walls that are independent of the tank's walls, so that it can be made in different widths for use in conventional tanks of different sizes. Instead of an under-gravel filter, a foam or cotton filter can be disposed within the bubble conduit below the diffuser. A plastic sheet with waterproof graphics printed thereon can be positioned in front of the back side of the tank to provide a decorative background scene; alternatively, the back side of the tank can be made transparent, and graphics can be positioned behind it. The storage space, and even the entire picture-frame housing can be eliminated, so that the tank is used alone. The tank can also be made with different dimensions, e.g., as a deep, rectangular box like most conventional aquariums, and displayed on a desk or floor stand. The light can be eliminated. Instead of an air stone, other types of suitable air diffusers can be used. The bubble conduit can be further divided by internal baffles into a series of lateral bubble tubes. The housing can be made of other materials, such as plastic. Instead of having a combination of opaque and transparent surfaces, the entire tank can be transparent. Instead of acrylic, the tank can be made of glass or other suitable materials. Therefore, the scope of the invention should not be determined by the examples given, but by the appended claims and their legal equivalents.

We claim:

1. A water current generating apparatus circulating water in a water tank having a predetermined width, comprising:

a substantially flat bubble conduit positioned in said water tank, said flat bubble conduit having spaced apart front and back vertical walls and connecting side walls, said front and said back walls extending substantially across said width of said water tank, said bubble conduit receiving an air emitting means for introducing a sheet of rising air bubbles therein, a water intake aperture positioned at a bottom end of said bubble conduit, and a water return aperture positioned at a top end of said bubble conduit, whereby when said bubble conduit is submerged in water received in said water tank, and said air emitting means is emitting a sheet of rising air bubbles within said bubble conduit, said rising air bubbles generate an upwardly moving water current within said bubble conduit, said water current circulates water from said water intake aperture, up through said bubble conduit, and out of said water return aperture.

2. The water current generating apparatus of claim 1 wherein said air emitting means comprises an air diffuser connected to an air pump.

3. The water current generating apparatus of claim 1 wherein said front wall of said bubble conduit is transparent.

4. A water current generating apparatus circulating water in a water tank having a front, a back, opposite sides, and a bottom, comprising:

a vertical partition positioned in said water tank substantially parallel to and spaced from said back, said partition and said back of said tank defining a compartment therebetween, said bubble conduit receiving an air emitting means for introducing a sheet of rising air bubbles therein, a water intake aperture positioned at a bottom end of said bubble conduit, and a water return aperture positioned at a top end of said bubble conduit, whereby when said bubble conduit is submerged in water received in said water tank, and said air emitting means is emitting a sheet of rising air bubbles within said bubble conduit, said rising air bubbles generate an upwardly moving water current within said bubble conduit, said water current circulates water from said compartment through said water intake aperture, up said bubble conduit, and out of said water return aperture back into said compartment.

5. The water current generating apparatus of claim 4 wherein said partition is transparent.

6. The water current generating apparatus of claim 4 wherein said partition is sized to extend substantially between said opposite sides of said water tank.

7. The water current generating apparatus of claim 4 wherein said water intake aperture comprises a lower edge of said partition spaced above said bottom of said tank, and said water return aperture comprises a top edge of said partition spaced below a water line of said tank when water is received therein.

8. The water current generating apparatus of claim 4 wherein said air emitting means comprises an air diffuser connected to an air pump.

9. The water current generating apparatus of claim 4, further including a pair of L-shaped brackets attached along opposite vertical edges of said partition, each of said brackets being adapted to hide a cord therein.

10. An aquarium apparatus circulating water therein comprising:

a water tank having a front, a back, opposite sides, and a bottom, a vertical partition extending between said opposite sides, said partition and said back of said tank defining a bubble conduit therebetween, said partition and said front of said tank defining a compartment therebetween, said bubble conduit receiving an air emitting means for introducing a sheet of rising air bubbles therein, a water intake aperture positioned at a bottom end of said bubble conduit, and a water return aperture positioned at a top end of said bubble conduit, whereby when said bubble conduit is submerged in water received in said water tank, and said air emitting means is emitting a sheet of rising air bubbles within said bubble conduit, said rising air bubbles generate an upwardly moving water current within said bubble conduit, said water current circulates water from said compartment through said water intake aperture, up said bubble conduit, and out of said water return aperture back into said compartment.

11. The aquarium apparatus of claim 10 wherein said partition is transparent.

12. The aquarium apparatus of claim 10 wherein said water intake aperture comprises a lower edge of said partition spaced above said bottom of said tank, and said water return aperture comprises a top edge of said partition spaced below a water line of said tank when water is received therein.

13. The aquarium apparatus of claim 10 wherein said air emitting means comprises an air diffuser connected to an air pump.

14. The aquarium apparatus of claim 10, further including a pair of vertical rails disposed on said opposite sides of said tank slidably receiving said partition.

15. The aquarium apparatus of claim 10, further including a picture-frame shaped housing receiving said water tank therein.

16. The aquarium apparatus of claim 15 wherein said housing includes a hidden storage space adapted for storing and hiding an air pump.

17. The aquarium apparatus of claim 16, further including an electrical extension cord partially received in said storage space.

18. The aquarium apparatus of claim 15, further including a lamp attached to said housing for illuminating said water tank.

* * * * *